Figure 1B:
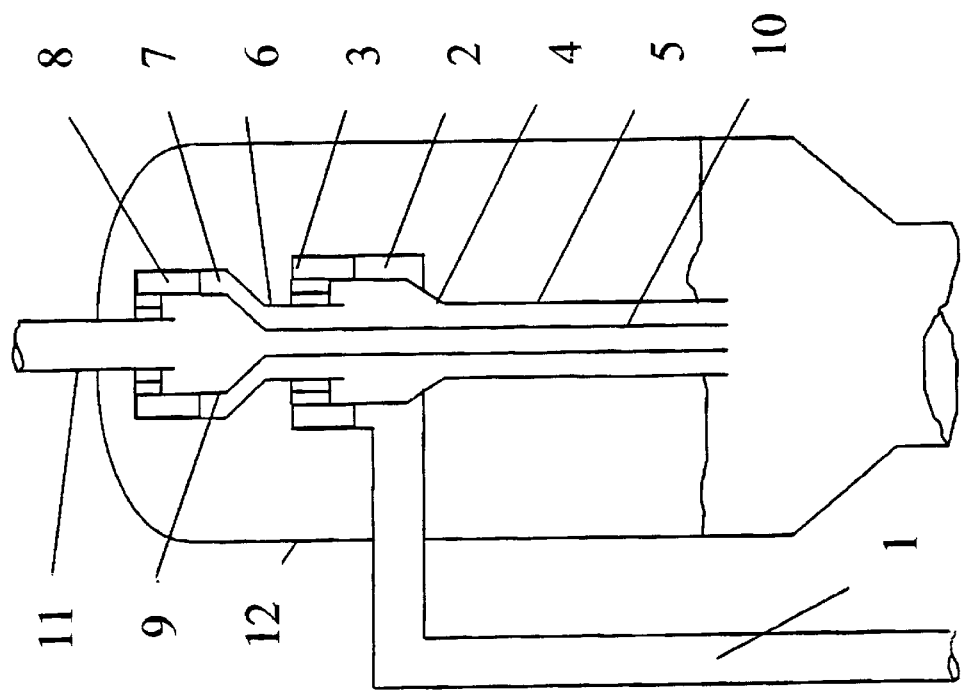

United States Patent
Jakkula

[11] Patent Number: 6,022,390
[45] Date of Patent: Feb. 8, 2000

[54] ASSEMBLY FOR SEPARATING SOLIDS FROM A GASEOUS PHASE

[75] Inventor: Juha Jakkula, Kerava, Finland

[73] Assignee: Neste Oy, Espoo, Finland

[21] Appl. No.: 09/017,488

[22] Filed: Feb. 2, 1998

[30] Foreign Application Priority Data

Nov. 17, 1997 [FI] Finland ................................. 974263

[51] Int. Cl.[7] .................................................. B01D 45/12
[52] U.S. Cl. ............................... 55/345; 55/344; 55/418; 55/459.1; 55/459.4; 208/161
[58] Field of Search ........................... 55/342, 343, 344, 55/345, 418, 459.1, 459.4; 208/161; 209/139.2; 95/34, 271

[56] References Cited

U.S. PATENT DOCUMENTS

| | | |
|---|---|---|
| 2,515,155 | 7/1950 | Munday .................................. 55/343 |
| 2,796,147 | 6/1957 | Coanda .................................. 55/459.1 |
| 2,802,280 | 8/1957 | Sylvest .................................. 55/345 |
| 3,146,998 | 9/1964 | Golucke et al. ........................ 55/345 |
| 3,716,003 | 2/1973 | Battcock . |
| 4,546,709 | 10/1985 | Astrom . |
| 5,070,822 | 12/1991 | Kinni et al. . |
| 5,665,949 | 9/1997 | Fusco et al. . |

*Primary Examiner*—David A. Simmons
*Assistant Examiner*—Robert Hopkins
*Attorney, Agent, or Firm*—Birch, Stewart, Kolasch & Birch, LLP

[57] ABSTRACT

The invention relates to a method of separating solids from a gas flow in a fluidized catalytic process and to a cyclone assembly suited for use in a fluidized catalytic process. According to the invention, the gas flow of the process carrying the suspended solids is passed into a separation assembly, wherein the solids are separated from the gaseous phase under the effect of the centrifugal force, whereby a multiport cyclone is used as the separation assembly, into which the gas flow to be treated is passed via an inlet nozzle having an axially annular cross section. The use of the multiport cyclone, e.g., in an FCC process gives significant advantages in flow dynamics and process engineering over conventional arrangements and generally used single-port cyclones.

7 Claims, 2 Drawing Sheets

ASSEMBLY FOR SEPARATING SOLIDS FROM A GASEOUS PHASE

The invention relates to separation of solids from gases. In particular, the invention concerns a method for separating solids from gas flows of fluidized catalytic processes circulating suspended solids. According to the present method, a gas flow carrying a catalyst or other solids in particulate form is passed into a cyclone assembly, wherein the solids are separated from the gaseous phase under the effect of the centrifugal force.

The invention also relates to a cyclone assembly for separating solids from gaseous-phase suspended flows in equipment used for running a fluidized catalytic process.

The method and assembly according to the invention can be used for treating hydrocarbons in processes used for, e.g., catalytic and thermal cracking, dehydrogenation, Fischer-Tropsch synthesis, manufacture of maleic acid anhydride and oxidizing dimerization of methane.

Hydrocarbon conversion processes are run using fixed-bed reactors and fluidized-bed reactors (fluidized catalytic reactors). In the present context, the term "fluidized catalytic process equipment" is used to refer to equipment used in processes having a fine-grained pulverized catalyst suspended, e.g., in a slowly upward rising gas flow, wherein the catalyst promotes desired reactions.

One of the most widely employed fluidized-catalyst reactor systems in the art is the FCC equipment, that is, fluidized-catalyst cracking equipment, comprising chiefly a riser tube operated in the fast-fluidization flow state, a large-volume reactor operated in a diluted suspension phase and a regenerator operated in the fluidized-bed state.

In the FCC unit, the riser tube and the large-volume reactor deliver a solids suspension flow, whose particulate matter and product gas are separated from each other in cyclones utilizing the effect of the centrifugal force. Typically, a number of cyclones must be connected in series along the gas flow in order to improve the overall separation efficacy, because single cyclones of normal construction exhibit inferior separation performance for particles smaller than 15 µm. Herein, a cyclone is rated effective if it can separate these small-diameter particles from the gas flow.

Cyclone separators have either a coiled or spiralled structure in which the particulate matter suspension is directed as a tangential flow into the cylindrical section of the cyclone, whereby the catalyst particles are separated from the gas under the centrifugal force when the flow circulates typically 7–9 revolutions within the cylindrical section of the cyclone and the conical section forming a continuation thereof, whereby the function of the conical section is to maintain the tangential speed of the gas flow so as resist its inherent tendency of slowing down. Also axial cyclones are known in which the gas flowing through a tube is forced into a circulating motion by means of vanes, whereby the solids under the centrifugal force are driven against the tube wall and separated thereon from the gas flow.

The most common cyclone type is the a spiralled cyclone called the Zenz cyclone, in which the proportions of the different parts of the cyclone are standardized, thus permitting the dimensioning of the cyclone to be based on graphs and computational formulas. The separation efficiency of this cyclone is enhanced by a large number of flow revolutions in the cyclone chamber, high flow rate at the inlet nozzle, higher density of solids, smaller cross section of the inlet nozzle port and lower viscosity of the gas.

In the preseparation cyclone of a fluidized-catalyst cracking unit, tests have shown the gas residence time to be in the order of 1.0–2.0 s from the riser top to the cyclone outlet, after which the catalyst will further stay in the separation vessel at an elevated temperature for 5–40 s. During this time, valuable compounds will be lost as a consequence of thermal reactions. Resultingly, gasoline products will be converted by thermal cracking into combustible gases, particularly hydrocarbons of the $C_2$ type. Other byproducts of thermal reactions are dienes, such as butadienes, which in the alkylation unit cause a significant increase of acid consumption. Pentadienes in turn are particularly reactive, whereby their detrimental effect is evidenced as a reduced oxidation resistance of FCC gasoline.

Other problems of conventional FCC units are their poor control of reaction time and erosion of the catalytic particles/circulating solids and reactor structures.

These problems are mostly related to such essential parts of the equipment as the separation units of gases from solids/catalysts, that is, cyclones, which in most cases are implemented as single-port units. To achieve the desired through-flow capacity, a plurality of these units are generally connected in parallel and then two or three in series.

In addition to being complicated and expensive, conventional cyclone constructions require a large footprint. Furthermore, the interior of the cyclones must be lined with a ceramic compound to prevent erosion.

The goal of the present invention is attained by replacing the conventional cyclones of a fluidized catalytic process with a multi-inlet cyclone (also known as a multiport cyclone), or alternatively, with a plurality of cyclones connected in series. The separation efficacy of a multiport cyclone can be made higher at low flow speeds and its structure is simpler and cheaper than that of conventional cyclones. Also the footprint required by the multiport cyclone is smaller.

The separation equipment, or cyclones, used in the invention comprise a cyclone chamber having an at least essentially upright aligned center axis and an at least essentially circular cross section of its internal space, whereby the separation chamber is rotationally symmetrical with respect to its center axis. To the separation chamber is connected an infeed nozzle of process gases having an essentially circular cross section centered about the center axis of the chamber. Further, the separation chamber includes a center tube arranged therein for removal of gases and a downward return leg (dipleg) for the recovery of solids separated from the gas phase. The separation chamber is equipped with a set of guide vanes forming a louver which forces the gas to be treated into a gas flow circulating close to the inner wall of the cyclone chamber, thus effecting the separation of solids from the gas phase under the effect of the centrifugal force.

The present invention provides significant benefits. Accordingly, the equipment construction according to the invention, which is based on the use of the multi-inlet cyclone, gives significant advantages in flow dynamics and process engineering over conventional arrangements and generally used single-port cyclones. This is because of the fact that in conventional single-port cyclones, the solids flow impinges on the cyclone inner wall as a homogeneous gas-suspended jet of high flow velocity which in primary cyclones is typically in the range 20–25 m/s, in secondary cyclones about 35 m/s, and in tertiary cyclones about 40 m/s. The flow rate of the impinging jet must be high, because the cyclone inlet nozzle width (jet width) is generally, e.g., in standardized Zenz cyclones about one-fourth of the cyclone diameter, and the particulate matter must be brought over the entire width of the impinging jet close to the cyclone inner wall in order to achieve separation of the solids from the gas flow. In this type of cyclone, the point most susceptible to erosion is the area of the cyclone inner wall receiving the jet impact of the suspended catalyst particles. By contrast, in the construction according to the invention, erosion problems are eliminated by improved flow dynamics: the single large-volume inlet flow is replaced by a plurality of smaller-volume mass flows impinging on the internal wall of the multiport cyclone, whereby the erosive effect is distributed over a larger area. By virtue of the multiport construction, the cyclone inlet ports can be made narrow, whereby the catalyst layer becomes shallow, and the flow velocity at the inlet port may be essentially smaller than in conventional single-port cyclones in which reduction of the inlet port width would require an increased channel height, resulting in a higher cyclone and making the communicating channel longer and clumsy in shape. The possibility of using a reduced cyclone inlet flow velocity contributes to a further lowered erosion rate, which according to published references is dependent on the flow velocity by a power of 4 to 5.

In tests carried out at room temperature, a cyclone of 465 mm diameter with full-area inlet ports and straight vanes, the separation efficiency was 99.99% at 5.6 m/s inlet flow velocity when the cross-sectional mass flow rate of the catalyst according to differential pressure measurements was over 200 kg/m$^2$s. In a conventional Zenz cyclone with compatible dimensions and flow rates, the separation efficiency was 99.10% computed by particle size fractions. A comparison of these separation efficiencies makes it clear that the novel cyclone with multiple narrow inlet ports according to the invention offers a superior efficiency when the design goal is to avoid high flow velocities leading to erosion.

In the construction according to the invention having the reactor riser tube (hereafter, shortly a riser) connected directly to the cyclone inlet tube, an accurately controllable residence time is achieved, because the catalyst is made to enter the cyclone from each point of its infeed tube simultaneously. A cyclone according to the invention may have its height reduced to half the volume of a standard cyclone (resulting in halved residence time), because the novel cyclone due to its improved flow dynamics can be dimensioned to have a shorter height.

According to a first preferred embodiment of the invention, the multi-inlet cyclone is used for separating catalyst from the product gases of a fluidized catalytic cracking (FCC) process. The multi-inlet cyclone may also be employed in the regenerator equipment of an FCC unit for separating the regenerated catalyst from the coke combustion gases.

Other suitable fluidized catalytic processes are, among others: catalytic reforming, oxidizing dimerization of phthalic acid anhydride, maleic acid anhydride or methane, Fischer-Tropsch synthesis, chlorination and bromination of methane, ethane and other hydrocarbons, and conversion of methanol into olefines or gasoline.

By contrast, the scope of the invention does cover fluidized-bed processes run in circulating fluidized bed in which the removal of the catalyst from the reaction zone occurs so rapidly that generally this type of fast-flowing fluidized layers can be maintained only by circulating the removed catalyst via cyclones.

Separation of solids is carried out using a plurality (e.g., 2–10, most appropriately 2–5) cyclones in a cascade. By virtue of their structure, the multiport cyclones used in the invention can be fitted concentrically inside one another so that, e.g., the downward return leg or dipleg of the next cyclone in the cyclone cascade is fitted inside the dipleg of the preceding cyclone. Owing to their longitudinally stacked and coaxial placing within the pressure shell, a significant volume reduction is attained with respect to conventional cyclone constructions requiring side-by-side placement of the cyclones. A multiport cyclone can be made with a larger diameter than a conventional cyclone; the diameter of multiport cyclones can be over one meter, even up to several meters, whereas the diameter of a conventional cyclone is generally limited to 1 m maximum. Yet, the diameter of the reaction vessel need not be increased in the embodiment according to the invention, but instead, may even be made smaller.

The cyclone infeed nozzle has preferably an annular cross-section in particular when the gas flow comes from outside of the reactor. This annular cross-section of the nozzle can be formed from the intershell space remaining between two concentrically adapted cylindrical or partially conical envelope surfaces, whereby said annular space may be divided in the direction of its longitudinal axis into parallel flow segments by means of baffles. The parallel flow segments can be implemented by mounting longitudinally aligned baffles radially between the two coaxial, cylindrical envelope surfaces. Almost an equivalent result is obtained by constructing the infeed nozzle of axially annular cross section from a set of parallel infeed tubes mounted equidistantly spaced in a circular fashion.

The guide vanes of the cyclone are adapted in a circularly louvered fashion about the perimeter of the cyclone chamber interior wall, partially or entirely inside the riser channel so as to form a louver comprising a plurality of parallel inlet channels for the entering gas flow.

The cyclone(s) according to the invention either is/are connected directly to the riser channel (shortly, riser) of a fluidized catalytic process reactor, which is a preferred embodiment of the invention, or alternatively, the infeed nozzle(s) of the cyclone(s) is/are adapted to communicate with the gas space of a fluidized catalytic process reactor, as is the case with conventional arrangements.

Figure 1A:
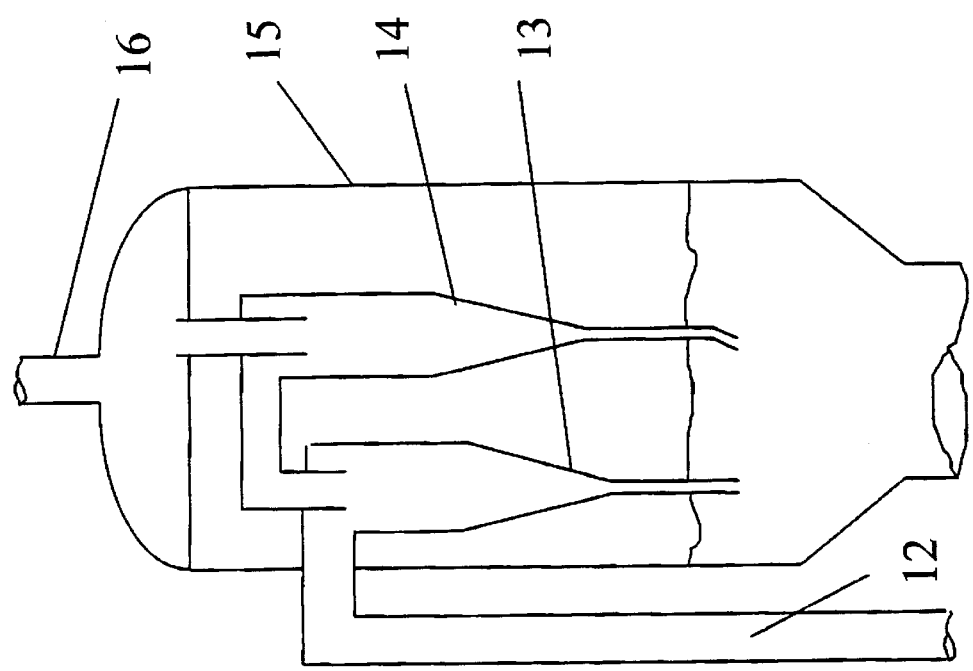

Next, the invention will be examined closer with the help of a detailed description by making reference to the appended drawings in which:

FIG. 1A shows a schematic layout of a conventional cyclone construction and

Figure 2B:
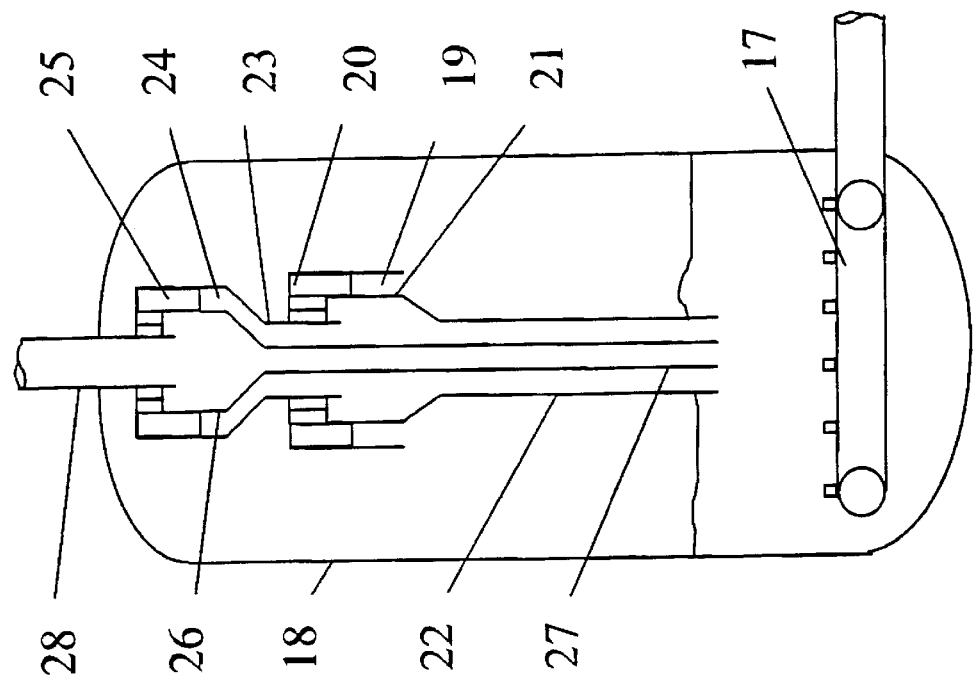
Figure 2A:
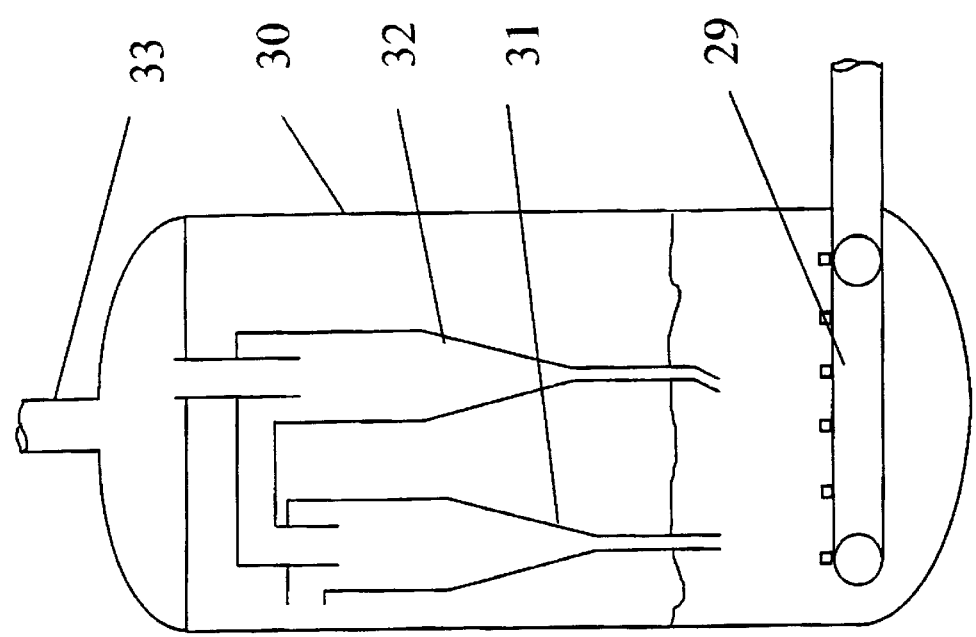

FIG. 1B shows a schematic layout of a cyclone construction according to the invention having two series-connected cyclones (a primary cyclone and a secondary cyclone) directly adapted to the riser tube of an FCC reactor; and FIGS. 2A and 2B show a schematic layout of a conventional cyclone and, respectively, a cyclone construction according to the invention having two series-connected cyclones (a primary cyclone and a secondary cyclone) directly adapted into an FCC regenerator.

In a conventional FCC cyclone construction, the mixture of the prefluidization gas and the evaporated phase of reacted and still reacting hydrocarbon travels in a gaseous phase upward along a riser tube 12, whereby the gas flow with the suspended catalyst travels into a primary cyclone 13 adapted to the interior of a reactor vessel 15. The particulates of the flow are separated from the gaseous phase by impinging on the interior wall of the separation chamber 13 and falling therefrom into the downward return leg of the primary cyclone. From the return leg, the catalyst travels further into the hydrocarbon separation section and the regenerator. The gas flow entering the primary cyclone leaves the cyclone via the center tube passing into the secondary cyclone 14. The particles are separated from the gaseous phase by impinging on the interior wall of the cyclone chamber and falling therefrom into the downward return leg of the secondary cyclone. From the secondary cyclone, the gas flow passes further into a possible buffer chamber and finally leaves the reactor via an outlet nozzle 16.

In an embodiment according to the invention, the mixture of the prefluidization gas and the evaporated phase of reacted and still reacting hydrocarbon travels in a gaseous phase upward along a riser tube 1, whereby the gas flow with the suspended catalyst travels into an annular space 2 formed in the interior of a reactor 12, wherefrom the flow further rises into a guide vane louver 3 of the primary cyclone. The function of the louver 3 is to induce a vorticous flow in which the particles are separated from the gaseous phase by impinging under the centrifugal force on the interior wall 4 of the chamber and falling therefrom into the downward return leg 5 of the primary cyclone. From the return leg, the catalyst travels further into the hydrocarbon separation section and the regenerator. The gas flow entering the primary cyclone leaves the cyclone via the center tube 6, wherefrom the flow rises further along the channel 7 of annular cross section into the guide vane louver 8 of the secondary cyclone. The particles are separated from the gaseous phase by impinging on the interior wall 9 of the cyclone chamber and falling therefrom into the downward return leg 10 of the secondary cyclone. The return leg 10 of the secondary cyclone is advantageously adapted into the interior of the primary cyclone return leg 5. From the secondary cyclone, the gas flow leaves the cyclone and the reactor via an outlet tube 11.

Now referring to FIGS. 2A and 2B, therein are illustrated both a conventional cyclone construction and a cyclone construction according to the invention, respectively, both configurations having two cyclones (a primary cyclone and a secondary cyclone) connected in series in the interior of an FCC regenerator. The number of series-connected cyclones may be varied so as to be either greater or smaller than the two cyclones shown series-connected in the diagram. Since a conventional cyclone can have a diameter of about 1 m maximum, generally more than one of such cyclones must be connected in parallel.

In a conventional cyclone construction, the inlet air which is passed through a bottom grate 29 fluidizes the catalyst contained in the regenerator 30 in a bubbling-bed condition and simultaneously imports oxygen to the coke combustion reaction. The gas with the suspended catalyst particles pass next into a primary cyclone 31 adapted to the interior of a regenerator 30. The particulates of the flow are separated from the gaseous phase by impinging on the interior wall of the separation chamber and falling therefrom into the downward return leg of the primary cyclone. From the return leg, the catalyst travels further back into fluidized bed. The gas flow entering the primary cyclone leaves the cyclone via the center tube passing into the secondary cyclone 32. The particles are separated from the gaseous phase by impinging on the interior wall of the cyclone chamber and falling therefrom into the downward return leg of the secondary cyclone. From the secondary cyclone, the gas flow passes further into a buffer chamber and finally leaves the reactor via an outlet tube 33.

In the arrangement according to the invention, the inlet air passed through a bottom grate 17 fluidizes the catalyst contained in the regenerator 18 in a bubbling-bed condition and simultaneously imports oxygen to the coke combustion reaction. In the preferred embodiment depicted in FIG. 2, the gas flow with the suspended catalyst particles rises into an annular space 19 formed in the interior of the cyclone, wherefrom the flow further rises into a guide vane louver 20 of the primary cyclone. The annular cross-section of the riser represents a particularly preferred embodiment, but in the configuration shown in FIG. 2, wherein the gas flow containing solids comes from the inside of the reactor, the riser can also have some other cross-section (e.g. circular). The function of the louver 20 is to induce a vorticous flow in which the particles are separated from the gaseous phase by impinging under the centrifugal force on the interior wall 21 of the chamber and falling therefrom into the downward return leg 22 of the primary cyclone. From the return leg, the catalyst travels further back into fluidized bed. The gas flow entering the primary cyclone leaves the cyclone via the center tube 23, wherefrom the flow rises further along the channel 24 of annular cross section into the guide vane louver 25 of the secondary cyclone. The particles are separated from the gaseous phase by impinging on the interior wall 26 of the cyclone chamber and falling therefrom into the downward return leg 27 of the secondary cyclone. The return leg 27 of the secondary cyclone is advantageously adapted into the interior of the primary cyclone return leg 22. From the secondary cyclone, the gas flow leaves the cyclone and the reactor via an outlet tube 28.

I claim:

1. A cyclone assembly for separating solids from a gas flow in fluidized catalytic process equipment, said assembly comprising
    (a) a cyclone cascade comprised of at least two multi-inlet cyclones, each of said cyclones comprising:
        a separation assembly comprising a separation chamber having an essentially upright aligned longitudinal axis and an essentially circular cross section of its interior wall, said separation chamber having a guide vane louver for inducing a vorticous flow of the gas to be treated circulating close to the interior wall of said separation chamber, thus effecting the separation of the solids from the gaseous phase under the effect of the centrifugal force,
        an infeed nozzle of gases to be treated, said nozzle being connected to said separation chamber,
        a center tube connected to said separation chamber for removal of gases, and
        a dipleg for recovering the solids separated from the gas flow,
    (b) a downward return leg of a subsequent cyclone in the cascade being fitted inside the dipleg of the preceding cyclone, and
    (c) said gas infeed nozzle of at least the second of said cyclones having an annular cross-section.

2. The cyclone assembly according to claim 1, wherein said gas infeed nozzle has an essentially annular cross section orthogonally to the center axis of said separation chamber.

3. The cyclone assembly according to claim 2, wherein said cyclone infeed nozzle is formed by the intershell space remaining between two concentrically placed cylindrical or partially conical envelope surfaces.

4. The cyclone assembly according to claim 2, wherein said infeed nozzle is divided into parallel flow segments in the axial direction of the cyclone by means of baffles.

5. The cyclone assembly according claim 4, wherein said parallel flow segments are formed by spanning between said two concentrically mounted cylindrical envelope surfaces baffle plates which are aligned parallel to the longitudinal axis of the reactor.

6. The cyclone assembly according to claim 1, wherein said infeed nozzle of essentially axially annular cross section is formed by parallel tubes equidistantly spaced in a circular fashion.

7. The cyclone assembly according to claim 1, wherein the guide vanes of the cyclone are fitted in a circularly louvered fashion about the perimeter of the cyclone chamber, partially or entirely in the interior of the cyclone riser channel so as to form a louver comprising a plurality of parallel inlet channels for the entering gas flow.

* * * * *